J. Shannon,
Cutter Head.
N° 49,161.   Patented Aug. 1, 1865.
Fig. 1
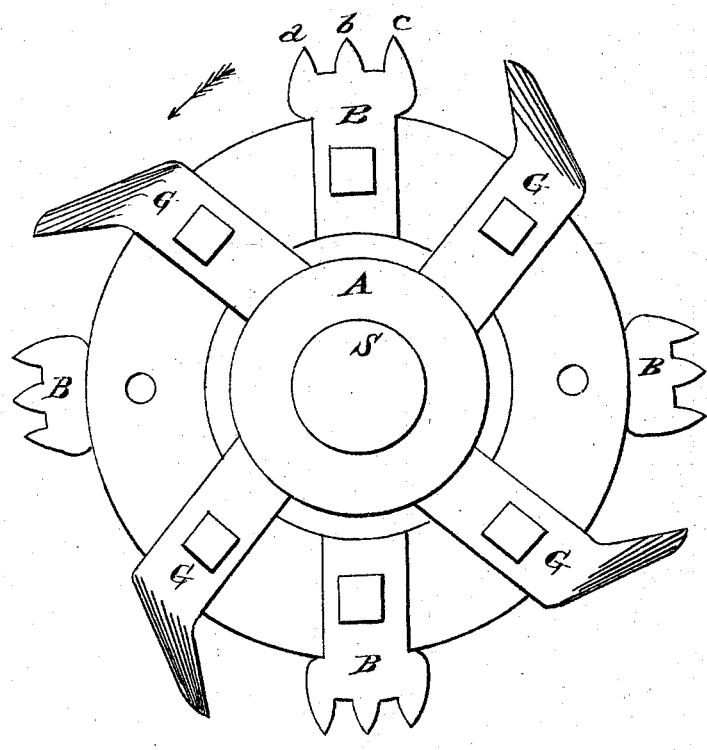
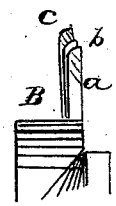
Fig. 2

UNITED STATES PATENT OFFICE.

JAMES SHANNON, OF COHOES, NEW YORK.

IMPROVEMENT IN CUTTERS FOR WOOD-TURNING LATHES.

Specification forming part of Letters Patent No. 49,161, dated August 1, 1865; antedated July 20, 1865.

*To all whom it may concern:*

Be it known that I, JAMES SHANNON, of Cohoes, Albany county, State of New York, have invented a new and useful Cutting-Tool for Service with that class of Lathes used for Turning Irregular Forms, such as shoe-makers' lasts, axhelves, &c; and I declare the following specification, with the drawings forming part thereof, to be a full and complete description of my invention.

Figure 1 represents the tool in profile; Fig. 2, as seen edgewise.

Similar letters in the figures denote the same parts of the apparatus.

The construction and arrangement of lathes for turning irregular forms is well known to mechanics. In them the pattern, with the material to be turned, revolve together on the same axis, the cutter revolving on a parallel axis, and the material to be turned being fed along gradually in front of the cutter. The cutter is a revolving disk, to the periphery of which is attached a set of gages similar to those shown in the drawings, or saws graduated by means of set-screws or otherwise to make the proper depth of cutting into the rough material being turned. With the best disposition of the gages there is so much danger of splintering the wood operated on or injuring the gages by too rank a cutting that the tool must be gaged for so slight a cutting as to require repeated traverses of the material to complete the job.

To expedite the operation by enabling the gages to complete their work more rapidly and making a more finished piece of work is the object of my invention.

It consists of a disk, A, fitted in the usual manner upon a revolving shaft, S. To A are affixed the gages G, arranged and gaged in the usual manner. Between these gages, and equidistant from them, are attached to the disk the cutting-tools B. They are constructed as shown in the drawings, their cutters being in the form of saw-teeth, *a b c*. The teeth of each tool are so gaged that during the revolution of the disk tooth *a* shall enter the wood its set distance, tooth *c* shall cut into it an equal distance, and tooth *b* (the middle tooth) one-eighth of an inch, or thereabout, deeper still, the gage following it being gaged to cut a quarter of an inch, or thereabout, deeper than the tooth *b*. These teeth are also set saw-fashion—that is, tooth *a* is set to cut in a line along and parallel with the face of the disk, tooth *b* is set to cut a little inward of it in reference to the moving direction of the cutter, and tooth *c* to cut still a little more inward of *b*. It will be seen that by this arrangement as the material passes along the cutter-tooth *a* will first make its cut into it, tooth *b* a little deeper, at the same time widening the cut, tooth *c* will widen the cut a little more and clear away any material that might be left in the cuts, so preparing the work for the gage, which follows it up with a deeper cut made into a surface reduced by its previous cuttings from a rough billet into a (comparatively) smooth cylinder.

From the drawings it will be seen that each alternate cutter B is affixed to an opposite side of the disk. The object of this is to allow the cutters to operate equally well whether the material be moving from the right hand to the left or from the left hand to the right. In moving from the right to the left hand the right-hand cutters precede in operation the gage, and the others do not touch the wood. In going from left to right the left-hand cutters precede the gages and the right-hand ones are inoperative.

In constructing cutter B, I do not limit myself to three teeth, but propose to use five or more, if requisite, arranged to cut in the manner described.

The practical advantages in the use of this tool over the usual gage or saw-cutters are these: It cuts away the surplus wood from the rough billet subjected to its operation by gradual steps and prepares an almost smooth cylindrical surface for the operation of the gages. The pioneer cutters, being strong teeth fitted for rude shocks, cannot be disabled and but slowly dulled by such rough grain or gnarliness of the wood as would ruin the fine edge of a gage; the saving of time and labor in repeated sharpenings of the gages, which, as they are now used, has frequently to be done; the further saving of time in the quicker completion of the work by the deeper cutting down of the wood at each traverse of the cutting-tool over its surfaces.

What I claim as my invention, and desire to secure by Letters Patent, is—

The construction of a cutting-tool by the combination of a gage or gages, G, with a toothed cutter, B, formed as described and attached to a revolving disk substantially as set forth in the within specification.

JAMES SHANNON.

Witnesses:
RICHD. VARICK DE WITT,
A. V. DE WITT.